United States Patent [19]
Bees

[11] Patent Number: 5,638,260
[45] Date of Patent: Jun. 10, 1997

[54] PARALLEL RESONANT CAPACITOR CHARGING POWER SUPPLY OPERATING ABOVE THE RESONANT FREQUENCY

[75] Inventor: George L. Bees, Framingham, Mass.

[73] Assignee: Electronic Measurements, Inc., Neptune, N.J.

[21] Appl. No.: 444,995

[22] Filed: May 19, 1995

[51] Int. Cl.⁶ .................................................. H02M 3/335
[52] U.S. Cl. ................................................ 363/17; 363/132
[58] Field of Search .............................. 363/17, 19, 132; 323/282; 320/1

[56] References Cited

U.S. PATENT DOCUMENTS

| | | | |
|---|---|---|---|
| 4,506,196 | 3/1985 | Bees | 320/1 |
| 4,679,129 | 7/1987 | Sakakibara et al. | 363/17 |
| 5,001,621 | 3/1991 | Egawa | 363/132 |
| 5,057,698 | 10/1991 | Widener et al. | 363/17 |
| 5,081,409 | 1/1992 | Goff | 318/811 |
| 5,121,314 | 6/1992 | Cathell et al. | 363/17 |
| 5,126,931 | 6/1992 | Jitaru | 363/21 |
| 5,151,852 | 9/1992 | Jacobson et al. | 363/131 |
| 5,243,509 | 9/1993 | Laeuffer | 363/17 |
| 5,262,931 | 11/1993 | Vingsbo | 363/16 |
| 5,274,543 | 12/1993 | Loftus, Jr. | 363/127 |
| 5,276,262 | 1/1994 | Klein | 363/134 |
| 5,313,383 | 5/1994 | Ikeuchi | 363/21 |
| 5,341,278 | 8/1994 | Brooks | 363/16 |
| 5,343,140 | 8/1994 | Gegner | 323/222 |

OTHER PUBLICATIONS

V.G. Agelidis et al., "A Low–Loss Full–Bridge PWM DC–DC Converter Topology", IEEE (1993), pp. 531–537.
J.A. Bassett, "New PWM Topology Features Zero–Voltage Switching and Constant Switching Frequency", PCIM (Jan. 1991), pp. 8, 10 & 13–15.

B. Mammano et al., "Fixed–Frequency, Resonant–Switched Pulse Width Modulation with Phase–Shifted Control", Unitrode Corporation (Sep. 1991), pp. 5–1 through 5–7.

Primary Examiner—Stuart N. Hecker
Attorney, Agent, or Firm—Michaelson & Wallace; John C. Pokotylo; Peter L. Michaelson

[57] ABSTRACT

A power supply for supplying a load capacitor and comprising a parallel resonant circuit having an inductor and a capacitor, a switching network operating at a frequency at or above the resonant frequency and applying alternating current to the resonant circuit and the primary side of a power transformer, a rectifier for rectifying the induced currents on the secondary winding of the transformer, and applying the rectified output to the load capacitor, and a controller for controlling the output of the power supply based on a comparison of the output voltage $V_{out}$ with a desired (setpoint) voltage $V_{prog}$. The resonant capacitance may consist of the power transformer winding self-capacitance. The resonant inductance may consist of the primary winding of the power transformer. The controller provides switching signals to operate the power supply at the resonant frequency of the resonant tank circuit during a "rapid rate charging mode" at which a maximum output current $I_{out}$ is applied to the load. When the controller senses that the output voltage $V_{out}$ is closely approaching the desired voltage $V_{prog}$, it gradually increases the switching frequency from the resonant frequency toward a maximum frequency during a "decreasing rate charging mode". When the controller senses that $V_{out}$ equals $V_{prog}$, it maintains the maximum switching frequency to provide a minimum output current $I_{out}$.

14 Claims, 3 Drawing Sheets

3
PARALLEL RESONANT CAPACITOR CHARGING POWER SUPPLY OPERATING ABOVE THE RESONANT FREQUENCY

BACKGROUND OF THE INVENTION

1. Field of Invention

The present invention concerns a capacitor charging power supply. More particularly, the present invention concerns a method for automatically controlling the output of a high voltage, parallel resonant mode power supply operating at a variable, non-audible frequency at or above its resonant frequency, including "charge" modes of operation and a "hold" mode of operation, and having an exceptionally smooth modal (i.e., charge mode to hold mode) transition, very low output ripple, and inherently stable output control characteristics in all operating modes. The present invention also concerns a device for implementing this method.

2. Description of the Prior Art

Known resonant power supplies have been used in various topologies for supplying power to various types of loads. A parallel resonant power converter typically has a transistor switching network connected to a resonant tank circuit having an inductor and a capacitor. The transistor switching network chops a DC input voltage thereby providing an alternating (i.e., a quasi-square wave) voltage across the resonant tank circuit and exciting a resonant current. A transformer is typically used to transfer power from the resonant tank circuit to a full bridge rectifier circuit. The rectified voltage is then applied to the load.

With such known resonant power supplies, the output voltage can be regulated by varying the switching frequency of the switching network. The output voltage is maximum when the switching frequency of the switching network is at the resonant frequency of the resonant tank circuit (which is $$\frac{1}{2\pi \sqrt{L_{RT}C_{RT}}},$$

where $L_{RT}$ is the inductance of the resonant tank circuit and $C_{RT}$ is the capacitance of the resonant tank circuit) and decreases as the switching frequency of the switching network deviates from the resonant frequency point.

Capacitive loads are often used in high voltage applications such as laser pumps, spark gaps, igniter sources and other high voltage pulsed load applications. Capacitor charging power supplies must be "short circuit proof" because an uncharged capacitive load presented to the power supply will initially appear as a short circuit, i.e., it will draw a large current. Thus, in the absence of any control response, the output current must remain at some nominal value when the output of the supply is, or appears to be, shorted.

The capacitor charging power supply must also be able to deliver a large amount of energy to the capacitive load to rapidly charge it. Once the capacitive load is adequately charged, the supply must also be able to maintain the charge of the capacitor with a minimum amount of output voltage ripple. Otherwise, excessive output voltage ripple may cause untimely and inappropriate pulsing of the capacitive load due to fluctuations in the voltage across it. For example, if the voltage varies from pulse to pulse, the energy delivered to the load capacitor will vary. This variation is undesirable because it may affect the consistency of a process controlled by the load capacitor. For example, a capacitor may be charged, and then discharged into a laser having an output used to expose semiconductor wafers to create an image of the integrated circuit pattern. Lasers are highly non-linear devices and a small variation in their input voltage may cause a large variation in their output power. Thus, output voltage ripple by the power supply may cause variations in the output power of the laser which in turn may cause undesirable exposure changes. The variation of the output caused by output ripple may also disadvantageously vary the time at which an energy pulse is delivered by the load capacitor. For example, some pulse systems include saturating magnetic components which operate at a fixed V*T (voltage*time) product. Thus, variations of an input voltage of these components may cause time variations in their outputs. This variation, known as "time jitter," may cause time synchronization problems for example. Lastly, the power supply must be able to smoothly transition from rapidly charging the capacitor to maintaining the charge of the capacitor.

Known capacitor charging power supplies have used two modes of operation, though they suffer from some or all of the problems addressed by the present invention. For example, the power supply discussed in U.S. Pat. No. 5,121,314 (hereinafter "the '314 patent") uses two operating modes in a fixed-frequency, series-resonant, high voltage capacitor charging power supply. The power supply of the '314 patent operates in a first "full charge mode" at a 100% duty cycle with an open control loop to apply maximum power to the capacitive load until the desired voltage is reached, whereupon the duty cycle is reduced abruptly to 13% or less. This abrupt change in the duty cycle precludes a smooth modal transition. Moreover, the abrupt change in the output voltage (approximating a discontinuity) caused by the abrupt change in duty cycle creates a high frequency component which requires a more accurate feedback control. Finally, the device discussed in the '314 patent operates at a fixed switching frequency. Thus, the resolution of the output control is limited by the resolution at which the duty cycle can be changed.

In view of the aforementioned problems with known power supplies for supplying capacitive loads, a short circuit proof power supply is needed. The power supply should also be capable of charging a capacitive load at a rapid rate (e.g., since a capacitive load may be discharged at a rate of several KHz, the power supply of the present invention should be able to recharge the capacitive load in a time on the order of a msec, and preferably on the order of tens or hundreds of μsec) to a desired voltage. At the same time, the power supply should avoid undesirable, and potentially load-damaging, overvoltage or overshoot conditions. The power supply should be able to precisely maintain the capacitive load at the desired voltage level with extremely low output ripple (preferably 0.05% or less). The power supply should operate at frequencies above the audible range. The power supply should also responsively adjust to AC or DC input voltage fluctuations such that these fluctuations are not transferred to the load.

An object of the present invention is to provide an apparatus, having the above-mentioned desirable properties, for converting a first input DC voltage (300 V DC, for example) to a second output DC voltage (40 KV DC, for example) for charging a load capacitor.

SUMMARY OF THE INVENTION

The present invention achieves the aforementioned objects by providing a power supply circuit which includes a variable frequency switching network (such as a half-bridge inverter, for example) which is supplied with a DC input voltage. The switching network alternately applies positive and negative voltages (in a quasi-square wave) to a parallel resonant tank circuit and the primary winding of a power transformer. The resonant tank circuit comprises an associated capacitance and an associated inductance. The inductance may include the leakage inductance of the power transformer and the capacitance may include the winding self-capacitance of the power transformer.

In a preferred embodiment of the present invention, the switching action causes sine wave quantums of current to flow through the primary winding of the power transformer in alternating directions. The switching advantageously occurs at a non-audible frequency, at or above the resonant frequency of the resonant tank circuit. The exact frequency of operation is determined by a control circuit. The secondary winding of the power transformer is coupled, via a rectifier, to the load capacitor.

Using a control circuit, which varies the switching frequency of the switching network based on the output voltage, the load capacitor is charged to the desired voltage level during a "charge" modes (including a "rapid rate charge mode" and a "decreasing rate charge mode") and this charge voltage level is maintained by the control circuit during a "hold mode". That is, as the switching frequency of the switching network reaches its maximum level (e.g., 150 KHz), corresponding to the minimum resonant output voltage level, the controller enters a "hold mode" of operation. In the "hold mode", high frequency, low energy switching bursts are caused to occur in the switching network. As a result, the capacitor charge voltage is maintained with extremely low ripple. The "decreasing rate charge mode" occurs at a time period between the "rapid rate charge mode" and the "hold mode". During this time period, the switching frequency is increased (continuously and preferably linearly) from $f_{resonant}$ to $f_{max}$ (See time $t_1$ to $t_2$ in FIG. 3) during which the charging current applied to the output load may be continuously and substantially linearly reduced.

A feedforward means for sensing variations in the input DC voltage source may be used to provide these variations to the control circuit. The control circuit can then adjust the operation of the switching network, if necessary, based on the sensed variations in the input DC voltage.

In a preferred embodiment of the present invention, the switching network and resonant components together form a half-bridge parallel resonant inverter. The parallel resonant inverter converts the DC input power to an alternating current having an adjustable frequency at or above the resonant frequency. The output of the parallel resonant inverter is rectified and applied to the load capacitor. Rapid charging of the capacitor is accomplished by operating the inverter at a frequency at or near its resonant point (e.g., ≅50 KHz).

The present invention solves several problems associated with charging capacitive loads and maintaining that charge; namely the output power applied to the load during the "rapid rate charge mode" is maximized while controlling a smooth linear transition (during the "decreasing rate charge mode") to the "hold mode". In addition, the "hold mode" of operation advantageously maintains a constant output voltage while minimizing the output voltage ripple.

In instances where the output voltage must be brought to zero, but the switching frequency cannot be brought high enough to effect such an output, the switching network may be shut-off (i.e., disabled) periodically by the control circuit.

DETAILED DESCRIPTION

After reading the following detailed description, those skilled in the art will readily appreciate that a capacitor charging power supply of the present invention can be used to supply power to a wide variety of loads, including purely capacitive loads. Furthermore, the parallel resonant mode power supply of the present invention may be used to supply power to other types of passive or active loads. Since, however, the present invention is particularly advantageous for supplying capacitive loads, it will be illustratively discussed in that context.

Figure 1:
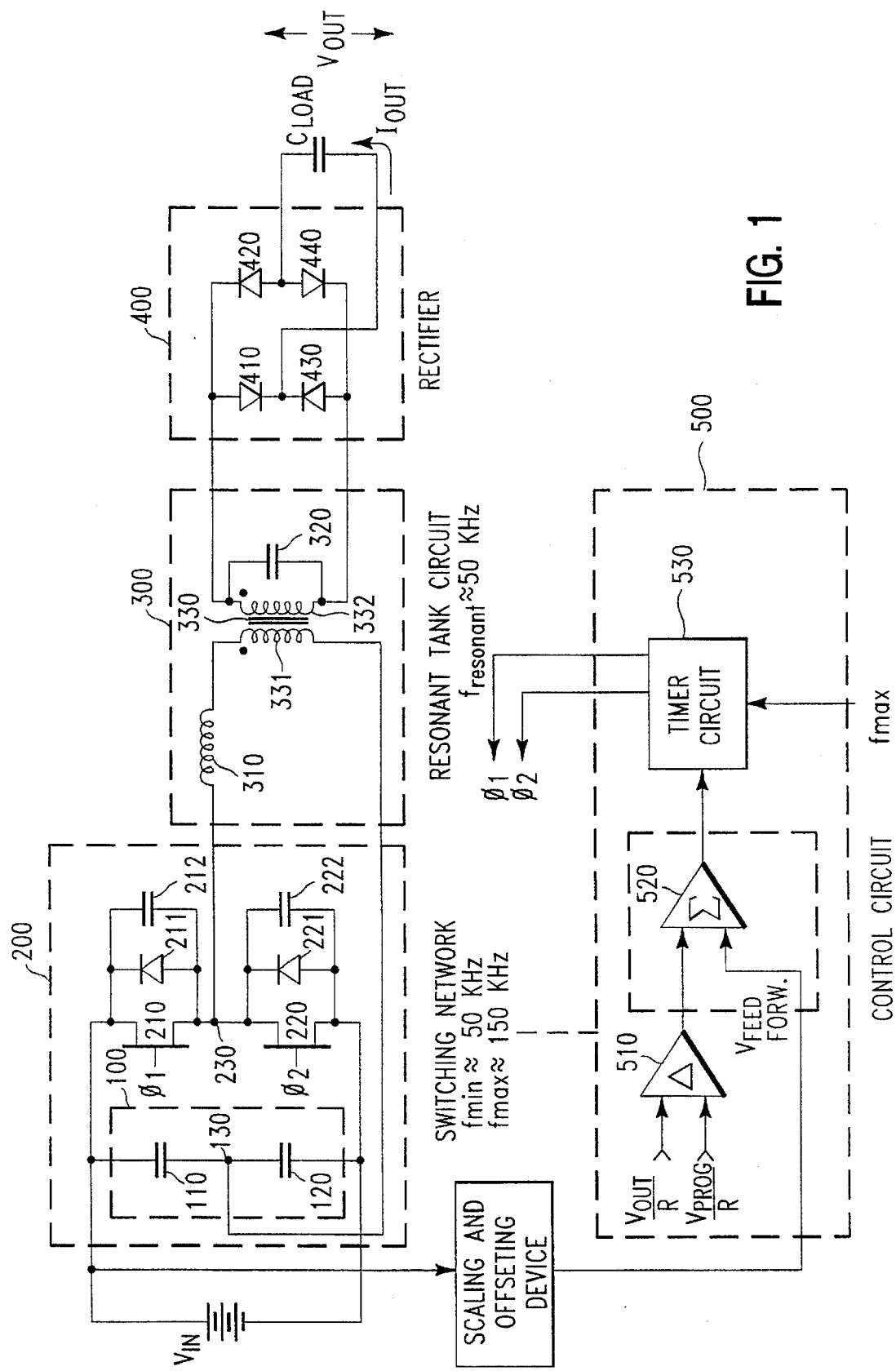
FIG. 1 is a schematic diagram of a parallel resonant capacitor charging power supply of the present invention.

FIG. 1 is a schematic diagram which illustrates the preferred embodiment of the power supply of the present invention. The power supply comprises a parallel resonant converter formed by a half-bridge zero voltage switching (ZVS) network 200 and a resonant tank circuit 300. The resonant tank circuit 300 has a resonant frequency of approximately 50 KHz and the switching network 200 may operate from approximately 50 KHz to approximately 150 KHz.

Although a desire to operate the power supply above audible frequencies limits the minimum switching frequency, the minimum switching frequency is further limited by a desire to have a relatively small power supply. Specifically, if the switching frequency is too low, the output transformer 330 would have to be unacceptably large. On the other hand, the maximum switching frequency is limited by the need to minimize switching losses in the switching network 200 and by the need to space the transformer 330 to adequately insulate the output from the rest of the power supply. This is particularly relevant in high voltage power supplies. For example, the power supply of the present invention may have an input voltage of about 300 V DC and an output voltage of about 40,000 V DC. The output voltage must be adequately insulated from the rest of the power supply to prevent arcing, stray capacitances, etc.

The output of the resonant inverter 300 is rectified by a full bridge rectifier 400 and presented to the load capacitor $C_{load}$. A controller 500 compares the actual output voltage (scaled by a factor 1/R) $V_{out}/R$ with a desired (setpoint) output voltage $V_{prog}/R$ (also scaled by a factor 1/R) using an error (differential) amplifier 510. The resulting difference signal (the "error signal") is provided to a timing circuit 530 (which may comprise a voltage controlled oscillator) which adjusts the switching network 200 drive signals $\phi_1$ and $\phi_2$ based on the error signal such that the output voltage $V_{out}$ is made to approach the programmed (setpoint) voltage $V_{prog}$. The output voltage $V_{out}$ and the desired (setpoint) voltage $V_{prog}$ are scaled by a factor 1/R because otherwise, they would be too large to be easily handled by typical control circuit elements.

The drive signals $\phi_1$ and $\phi_2$ of the switching network 200 should be 180° out of phase and should have a duty cycle of less than 50% to prevent the transistors 210 and 220 from conducting (i.e., being closed) simultaneously.

An optional device for minimizing the effect of input fluctuations is also shown. Specifically, a summing amplifier 520 adds the first error signal, output from the error amplifier 510, with a feed forward voltage $V_{FF}$ to provide a compensated error signal to the timing circuit 530. The feed forward voltage $V_{FF}$ is formed by scaling and offsetting the DC input voltage $V_{in}$ with the scaling and offsetting device 700. For example, the DC input voltage $V_{in}$ may be scaled by a factor of 0.1 and offset by subtracting 25 V to provide the feed forward voltage $V_{FF}$. Thus, in this example, the scaling and offsetting device 700 produces a feed forward voltage $V_{FF}$ of 0 V from a DC input voltage $V_{in}$ of 250 V, and produces a feed forward voltage $V_{FF}$ of 10 V from a DC input voltage of 350 V. Accordingly, in this case, the timing circuit 530 adjusts the switching network drive signals $\phi_1$ and $\phi_2$ based on the compensated error signal provided by the summing amplifier 520.

Figure 4:
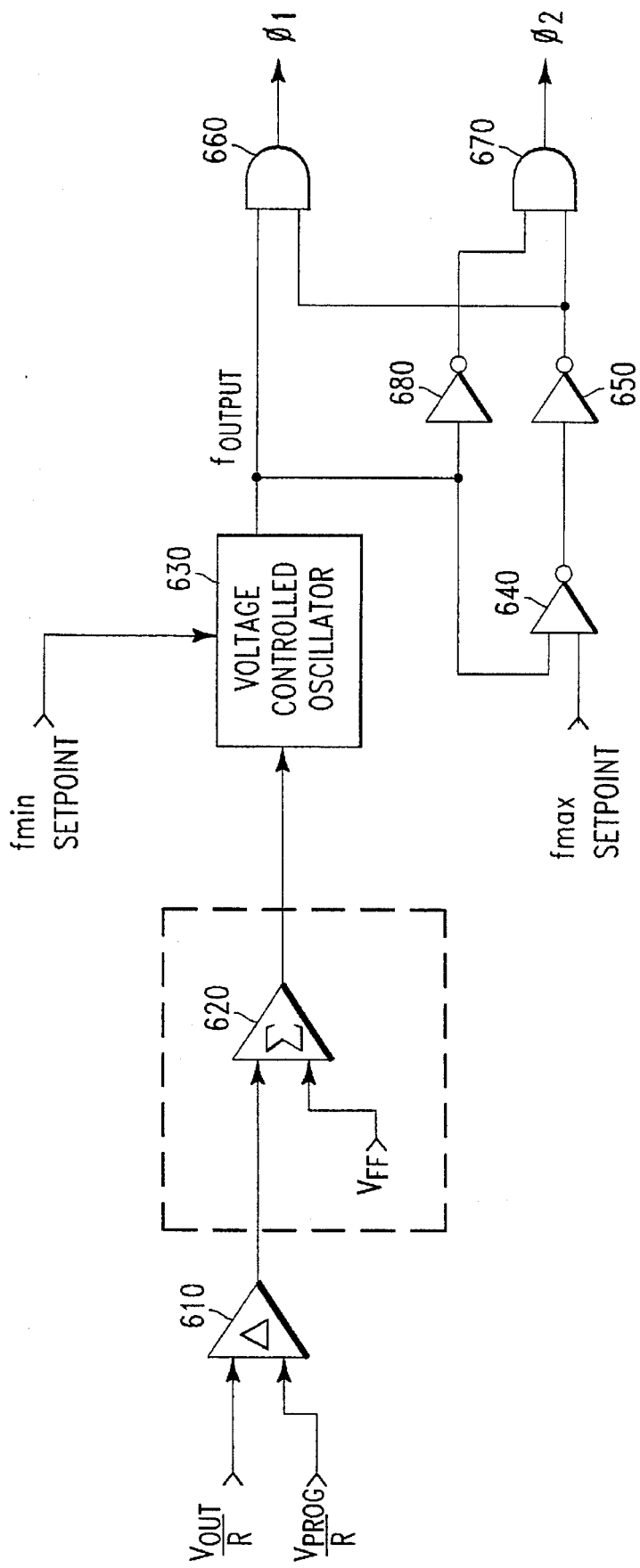
FIG. 4 is a schematic of an alternative controller which may be used with the parallel resonant capacitor charging power supply of the present invention.

FIG. 4 illustrates an alternative control circuit 600 which may be used instead of the control circuit 500. The output voltage (scaled by a scale factor 1/R) $V_{out}/R$ and the desired output voltage (also scaled by a factor 1/R) $V_{prog}/R$ are provided to an error (differential) amplifier 610. If a feedforward detection system is used to minimize the effects of input voltage fluctuations, the output of the error (differential) amplifier 610 and a feed forward voltage $V_{FF}$ (produced by scaling and offsetting the input DC voltage $V_{IN}$ as discussed above) are provided to a summing amplifier 620. The output of the summing amplifier 620 is then provided, as a first input, to a voltage controlled oscillator 630. Otherwise, if a feedforward detection system is not used, the output of the error (differential) amplifier 610 is provided, as a first input, to the voltage controlled oscillator 630. A minimum switching frequency value $f_{min}$ of the switching network 200 (e.g., 50 KHz) is also provided as a second input to the voltage controlled oscillator 630.

The output $f_{out}$ of the voltage controlled oscillator 630 is applied, as a first input, to a comparator 640. A maximum setpoint frequency $f_{max}$, representing the maximum switching frequency of the switching network 200 (e.g., 150 KHz), is applied, as a second input, to the comparator 640. The output of the comparator 640 is inverted by an inverter 650. Thus, when the output $f_{out}$ of the voltage controlled oscillator 630 is greater than the maximum switching frequency of the switching network 200, a low signal is output by the inverter 650.

The output of the voltage controlled oscillator $f_{out}$ is also applied to a first AND gate 660 and, via an inverter 680, to a second AND gate 670. The first and second AND gates 660 and 670 are also supplied with the output of the inverter 650. Thus, the switching signal $\phi_1$ is provided by the first AND gate 660 while the switching signal $\phi_2$ is provided by the second AND gate 670. Further, when the output $f_{out}$ of the voltage controlled oscillator 630 is greater than the maximum switching frequency of the switching network 200, the switching signals $\phi_1$ and $\phi_2$ are disabled by the low signals applied to AND gates 660 and 670, respectively, by the inverter 650.

The parallel resonant power supply of FIG. 1 is now explained in detail. A first DC input voltage $V_{in}$ (300 V DC, for example) is applied across a capacitive voltage divider circuit 100 formed by a first capacitor 110 and a second capacitor 120 connected in series. A junction 130 is defined at a node between the first and second capacitors 110 and 120, respectively. One half of the input voltage $V_{in}$ is dropped across each of capacitors 110 and 120 such that the junction 130 is at a voltage $V_{in}/2$. A half-bridge inverter of the switching network 200 is arranged in parallel with the capacitive divider circuit 100. The half-bridge inverter is formed by first and second Metal Oxide Field Effect Transistors (MOSFETs) 210 and 220, respectively. A first intrinsic anti-parallel diode 211 and a first snubbing capacitor 212 are each connected across the first transistor 210 (i.e., from its source to its drain). Similarly, a second intrinsic anti-parallel diode 221 and a second snubbing capacitor 222 are each connected across the second transistor 220 (i.e., from its source to its drain).

The first transistor 210 is controlled by switching waveform $\phi_1$ applied at its gate and output by the timing circuit 530 (or AND gate 660) and the second transistor 220 is controlled by switching waveform $\phi_2$ applied at its gate and output by the timing circuit 530 (or AND gate 670). A junction 230 is defined at a node between the first and second transistors 210 and 220, respectively. The switching network operates in a well known zero voltage switching (ZVS), soft-switching manner to minimize switching losses.

A resonant inductor 310 of the resonant tank circuit 300 is coupled between the junction 230 of the switching network 200 and a first end of the primary winding 331 of a transformer 330 of the resonant tank circuit 300. A second end of the primary winding 331 is coupled with the junction 130 of the capacitive divider 100. A resonant capacitor 320 of the resonant tank circuit 300 is connected in parallel with the secondary winding 332 of the transformer 330. The inductance of the transformer 330 constitutes part of the total resonant inductance of the resonant tank circuit 300. The interwinding capacitance of transformer 330 constitutes part of the total resonant capacitance of the resonant tank circuit 300.

Figure 2:
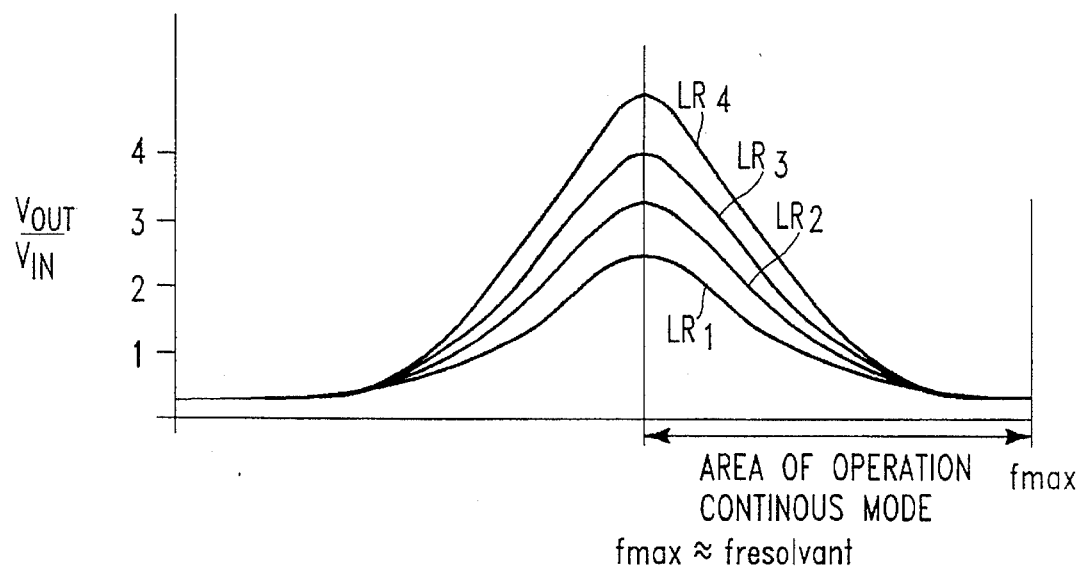
FIG. 2 is a family of characteristic gain curves of a parallel resonant converter at various load impedances.

FIG. 2 is the family of characteristic gain curves of the parallel resonant converter of the present invention. The gain ($V_{out}/V_{in}$) is plotted as a function of the switching frequency of the switching network 200. As the curves show, the gain is maximum at the resonant frequency $f_{resonant}$ (about 50 KHz) of the resonant tank circuit 300 and declines as the switching frequency of the switching network 200 deviates from the resonant frequency $f_{resonant}$. Hence, with a fixed input voltage, the output voltage will decrease as the switching frequency $f_{switch}$ of the switching network 200 increases above the resonant frequency $f_{resonant}$. The output voltage will also decrease as the switching frequency $f_{switch}$ of the switching network 200 decreases below the resonant frequency $f_{resonant}$. However, this characteristic is not exploited because the switching network 200 should operate above audible frequencies and at frequencies permitting the use of a smaller transformer 330 as discussed above.

As the output voltage decreases, the amount of energy available to charge the capacitor decreases until the maximum switching frequency $f_{max}$ (about 150 KHz) of the switching network 200 is reached. Accordingly, as the gain decreases, so does the power applied to the capacitive load $C_{load}$. A comparison of the curves $LR_1$ (high impedance load) through $LR_4$ (low impedance load) in FIG. 2 also illustrates that the lower the impedance of the output load, the higher the peak gain.

In a capacitor charging power supply where the initial required output charging current will be maximum, which will be reduced to a minimum to reduce output ripple, the characteristic curve of parallel resonant converters is advantageously utilized. Specifically, the frequency during the "rapid rate charging mode" is at or about the resonant frequency $f_{resonant}$, the frequency range for the "decreasing rate charge mode" operation of the power supply is between the resonant frequency ($f_{resonant}$) and the maximum frequency ($f_{max}$), and the frequency for the "hold mode" operation of the power supply is at about the maximum switching frequency $f_{max}$. If the output desired is such that the necessary switching frequency would exceed the maximum switching frequency $f_{max}$ (e.g., 150 KHz) of the switching network 200, then the supply will periodically shut-off (i.e., disable) the switches of the switching network 200. This "switch disable" can be achieved, for example, with the comparitor 640 and inverter 650 of FIG. 4, as discussed above.

Figure 3:
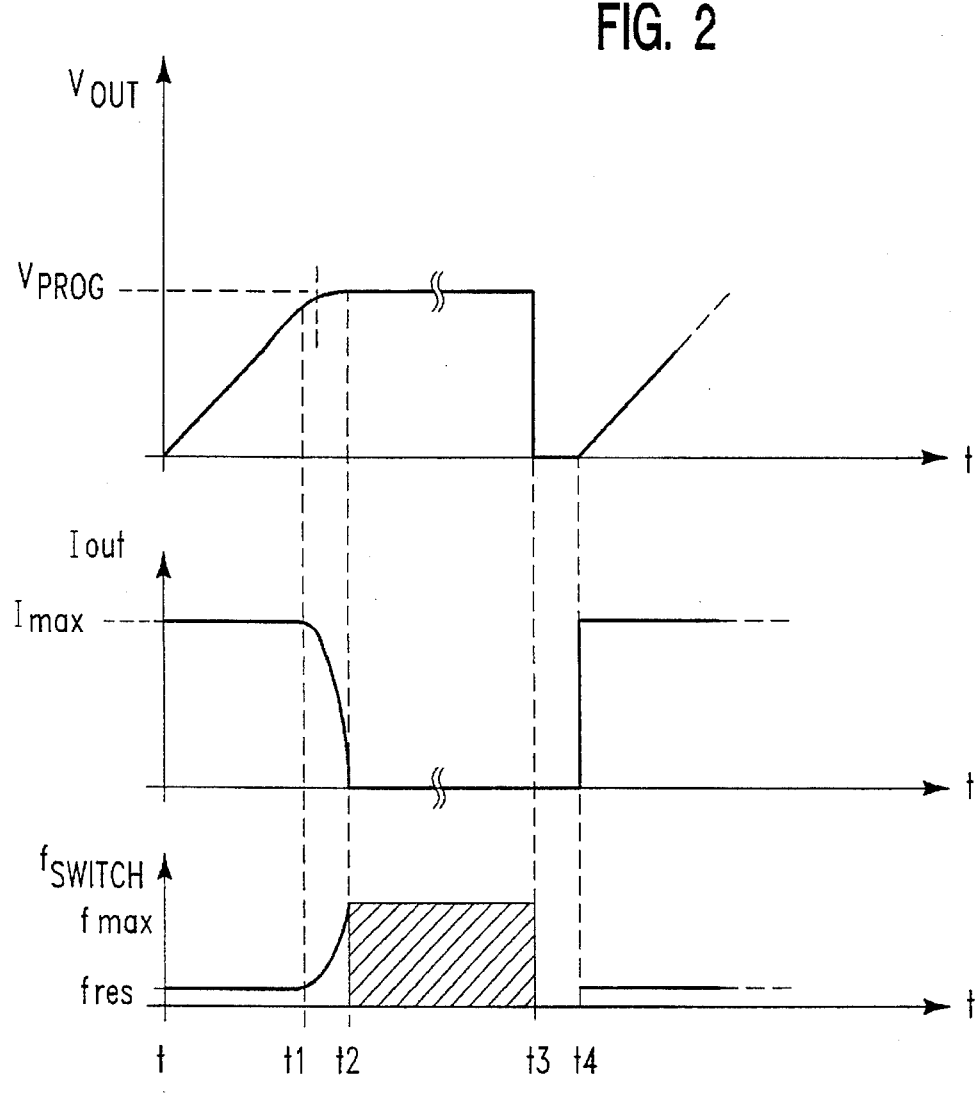
FIG. 3 is timing diagram illustrating the output voltage, output current and switching frequency for a capacitor-loaded, parallel resonant capacitor charging power supply of the present invention.

The operation and modes of the parallel resonant power supply are described with reference to FIG. 3 which illustrates the timing relationship between the output voltage $V_{out}$, the output current $I_{out}$, and the switching frequency $f_{switch}$ of the switching network 200 in the present invention. The purpose of the power supply is to cause the output voltage ($V_{out}$) across the load to reach a desired level ($V_{prog}$) in a minimum amount of time while avoiding an overshoot of the desired level. Thus, at time t(0), the power supply begins to charge the completely discharged load capacitor. This is called the "rapid rate charge mode". The initial condition of the load capacitor appears to be a short circuit because it draws current. Accordingly, the controller 500 causes the power supply to operate in the "rapid rate charge mode" at the resonant frequency $f_{resonant}$ of the resonant tank circuit 300 which in this case coincides with the minimum switching frequency $f_{switch}$ of the switching network 200. Operating the power supply at the resonant frequency $f_{resonant}$ causes the output current $I_{out}$ supplied to the load capacitor to be at a maximum $I_{max}$ (see time period $t_0$ to $t_1$). At time t(1), $V_{out}$ closely approaches $V_{prog}$. The controller 500 can detect this by comparing $V_{out}$ with a pre-determined threshold percentage (e.g., 95% of $V_{prog}$. Consequently, the controller 500 adjusts the switching frequency $f_{switch}$ (i.e., increases the switching frequency $f_{switch}$ from the resonant frequency $f_{resonant}$ of the resonant tank circuit 300) to reduce the output current $I_{out}$ supplied to the load capacitor. This "decreasing rate charge mode" occurs during the time period between t(1) and t(2) while the power supply continues to operate in a charge mode. However, the switching frequency $f_{switch}$ of the switching network 200 increases as the controller 500 determines that $V_{out}$ is closely approaching $V_{prog}$ as described above. Providing the "decreasing rate charge mode" ensures a smooth modal transition between the "charge modes" and the "hold mode". At time t(2), when the controller 500 determines that $V_{out}$ has reached $V_{prog}$, the controller 500 increases the switching frequency $f_{switch}$ to its maximum $f_{max}$, causing the output current $I_{out}$ to decrease to its minimum. At this point, the power supply is in the "hold mode" of operation. If the output voltage $I_{out}$ at $f_{max}$ is too large to prevent $V_{out}$ from exceeding $V_{prog}$, that is, if the output frequency four of the timer circuit 530 or the voltage controlled oscillator 630 is greater than the maximum switching frequency $f_{max}$ of the switching network 200, the switches of the switching network 200 may be periodically disabled as discussed above with reference to FIG. 4. At time $t_3$, the capacitor is discharged (or pulsed). The discharge is caused by an external factor, such as a controller for a laser, for example. The period from time $t_3$ to $t_4$ is a "deadtime" during which all switches are off.

As discussed above, some applications may require the load capacitor to be discharged on the order of a few KHz. Thus, the entire time from $t_0$ to $t_4$ may need to be on the order of msec or even tens of μsec.

We claim:

1. A power supply for converting an input DC voltage to an output DC voltage, the power supply comprising:

a) a switching network, coupled across the input DC voltage, for chopping the input DC voltage into a quasi-square wave;

b) a resonant tank circuit coupled with the switching network, receiving the quasi-square wave produced by the switching network, including a transformer having a primary winding and a secondary winding, and having a resonant inductance and a parallel resonant capacitance;

c) a rectifier coupled with the secondary winding of the transformer, for providing the output DC voltage; and d) a controller for comparing the output DC voltage provided by the rectifier with a desired output DC voltage to form an error signal and for providing a switching signal to the switching network, the switching signal having a frequency based on the error signal, wherein the controller may provide a switching signal above a resonant frequency of the resonant tank circuit, wherein the DC power supply has a characteristic gain which varies as a function of frequency and which is maximum at the resonant frequency of the resonant tank circuit.

2. The power supply of claim 1 wherein the resonant frequency is $$\frac{1}{2\pi \sqrt{L_{RT} C_{RT}}},$$

where $L_{RT}$ is the inductance of the resonant tank circuit and $C_{RT}$ is the capacitance of the resonant tank circuit.

3. The power supply of claim 1 wherein the resonant tank circuit further comprises an inductor connected in series with the primary of the transformer whereby the resonant inductance is due to the inductor and inductance of the transformer.

4. The power supply of claim 1 wherein the resonant tank circuit further comprises a capacitor connected in parallel with the secondary of the transformer whereby the resonant capacitance is due the capacitor and interwinding capacitance of the transformer.

5. The power supply of claim 1 wherein the rectifier is a full bridge rectifier.

6. The power supply of claim 1 wherein the switching network includes:

i) a voltage divider including a series connection of a first capacitor and a second capacitor thereby defining a node between the first and second capacitors; and ii) a half-bridge inverter including a series connection of a first controllable switch and a second controllable switch thereby defining a node between the first and second controllable switches, the half-bridge inverter being connected in parallel with the voltage divider, wherein, the primary of the transformer of the resonant tank circuit is coupled between the node of the half-bridge inverter and the node of the voltage divider.

7. The power supply of claim 6 wherein the node of the voltage divider has a voltage level of approximately one half of the input DC voltage.

8. The power supply of claim 6 wherein the first controllable switch is a transistor and the second controllable switch is a transistor.

9. The power supply of claim 6 wherein the first controllable switch is a MOSFET and the second controllable switch is a MOSFET.

10. The power supply of claim 1 wherein the controller provides a switching signal approximately at the resonant frequency of the resonant tank circuit during a first mode of operation during which the output voltage is much less than the desired output DC voltage, provides a switching signal having a frequency increasing from the resonant frequency of the resonant tank circuit to a maximum switching frequency of the switching network during a second mode of operation during which the output voltage closely approaches the desired output DC voltage, and provides a switching signal at the maximum switching frequency of the switching network during a third mode of operation to maintain the output voltage at the desired output DC voltage.

11. The power supply of claim 10 wherein the controller disables the switching signal in the third mode of operation when the output voltage exceeds the desired output DC voltage.

12. The power supply of claim 10 wherein the controller disables the switching signal when a frequency of the switching signal provided by the controller is greater than a maximum switching frequency of the switching network.

13. The power supply of claim 1 wherein the controller is provided with a feedforward input of the input DC voltage and adjusts the switching signal based, in part, on any fluctuations in the input DC voltage.

14. The power supply of claim 6 further comprising a capacitor and an anti-parallel diode arranged across the first controllable switch and a capacitor and an anti-parallel diode arranged across the second controllable switch.

* * * * *